(12) United States Patent
Hall et al.

(10) Patent No.: US 6,641,786 B2
(45) Date of Patent: Nov. 4, 2003

(54) REACTOR FOR PROCESSING GASEOUS MEDIA

(75) Inventors: Stephen Ivor Hall, Oxford (GB); James Timothy Shawcross, Charlbury (GB); Michael Inman, Abingdon (GB)

(73) Assignee: Accentus PLC, Didcot (GB)

( * ) Notice: Subject to any disclaimer, the term of this patent is extended or adjusted under 35 U.S.C. 154(b) by 155 days.

(21) Appl. No.: 09/984,964

(22) Filed: Oct. 31, 2001

(65) Prior Publication Data

US 2002/0127157 A1 Sep. 12, 2002

Related U.S. Application Data

(62) Division of application No. 09/485,823, filed on Feb. 16, 2000, now Pat. No. 6,322,758.

(30) Foreign Application Priority Data

Sep. 13, 1997 (GB) ............................................. 9719434

(51) Int. Cl.[7] ................................................ B01J 19/08
(52) U.S. Cl. .................................... 422/186.04; 60/275
(58) Field of Search ........................ 422/186.04; 60/275

(56) References Cited

U.S. PATENT DOCUMENTS 3,983,021 A * 9/1976 Henis .......................... 204/164
5,843,288 A * 12/1998 Yamamoto et al. .......... 204/164

* cited by examiner

Primary Examiner—Kishor Mayekar
(74) Attorney, Agent, or Firm—William H. Holt

(57) ABSTRACT

A reactor for the plasma processing of gaseous media, especially internal combustion engine exhaust, has a bed made of a body of ceramic material a series of gas permeable electrodes embedded within the bed. The electrodes are distributed to provide a predetermined electric field distribution within the bed.

7 Claims, 9 Drawing Sheets

REACTOR FOR PROCESSING GASEOUS MEDIA

This is a division of application Ser. No. 09/485,823 filed Feb. 16, 2000, now U.S. Pat. No. 6,322,758.

The present invention relates to the processing of gaseous media and more specifically to the treatment of the exhaust gases of internal combustion engines to reduce the emission of pollutants therefrom.

BACKGROUND OF THE INVENTION

Our earlier patent GB 2 274 412 discloses reactors for the treatment of exhaust emissions from internal, combustion engines to reduce the emission of pollutants such as $NO_x$, carbon monoxide and particulates. The active part of the reactors is a bed of particulate ferroelectric material contained between two gas permeable electrodes across which is applied a potential of the order of tens of kilovolts. In addition to removing particulates by oxidation, especially electric discharge assisted oxidation, there is disclosed the reduction of $NO_x$ gases to nitrogen, by the use of pellets adapted to catalyse the $NO_x$ reduction.

Somewhat similar systems also are disclosed in U.S. Pat Nos. 3,983,021; 4,954,320 and 5,147,516.

Examples of diesel exhaust particulate filters including gas permeable beds are to be found in European patent application EP 0 010 384; European patents EP 0 244 061; EP 0 112 634; EP 0 132 166 and U.S. Pat. Nos. 4,505,107; 4,485,622; 4,427,418 and 4,276,066.

Problems which occur with those systems which utilise plasmas formed in the exhaust gases as they pass through the bed of particulate material are irregularities in the generation of the plasma due to an uneven distribution of the electric field through the bed of particulate material and arcing or electrical tracking between the electrodes and other parts of the structures of the reactors.

SUMMARY OF THE INVENTION

It is an object of the present invention to provide an improved reactor for the treatment of internal combustion engine exhaust emissions.

According to the present invention there is provided a reactor for the plasma processing of gaseous media, comprising a reactor chamber including a gas permeable bed of non-conducting active material contained between at least one gas permeable member adapted to act as an electrode and another gas permeable member and means for constraining a stream of a gaseous medium to be processed to flow through the bed of active material wherein the bed of active material extends beyond the gas permeable electrode or electrodes thereby to isolate electrically the said electrode or electrodes from the means for constraining the exhaust gases to flow through the bed of active material.

Preferably the bed of active material has a structure which is self-supporting. Suitable structures are an open-celled solid foam, a honeycomb, or a fibrous mass. If the bed of active material is not self-supporting, then that part of the bed of active material which extends beyond the said electrode or electrodes is contained within electrically insulating heat resisting members. For example, if the reactor has an axial-flow configuration, then the electrode, or electrodes, may comprise electrically conducting mesh disks with a peripheral annulus of electrically insulating ceramic material. If the reactor has a radial flow configuration, with the electrode, or electrodes being in the form of an electrically conducting mesh cylinder or cylinders then the cylinder or cylinders can terminate in electrically insulating ceramic end pieces.

Preferably a series of gas permeable electrodes is embedded within the bed of active material and the electrodes are so distributed that a desired electric field distribution is created within the bed of active material. In a preferred arrangement, electrodes are arranged in groups of three (or more) and connected to a three (or more)-phase alternating current power supply.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
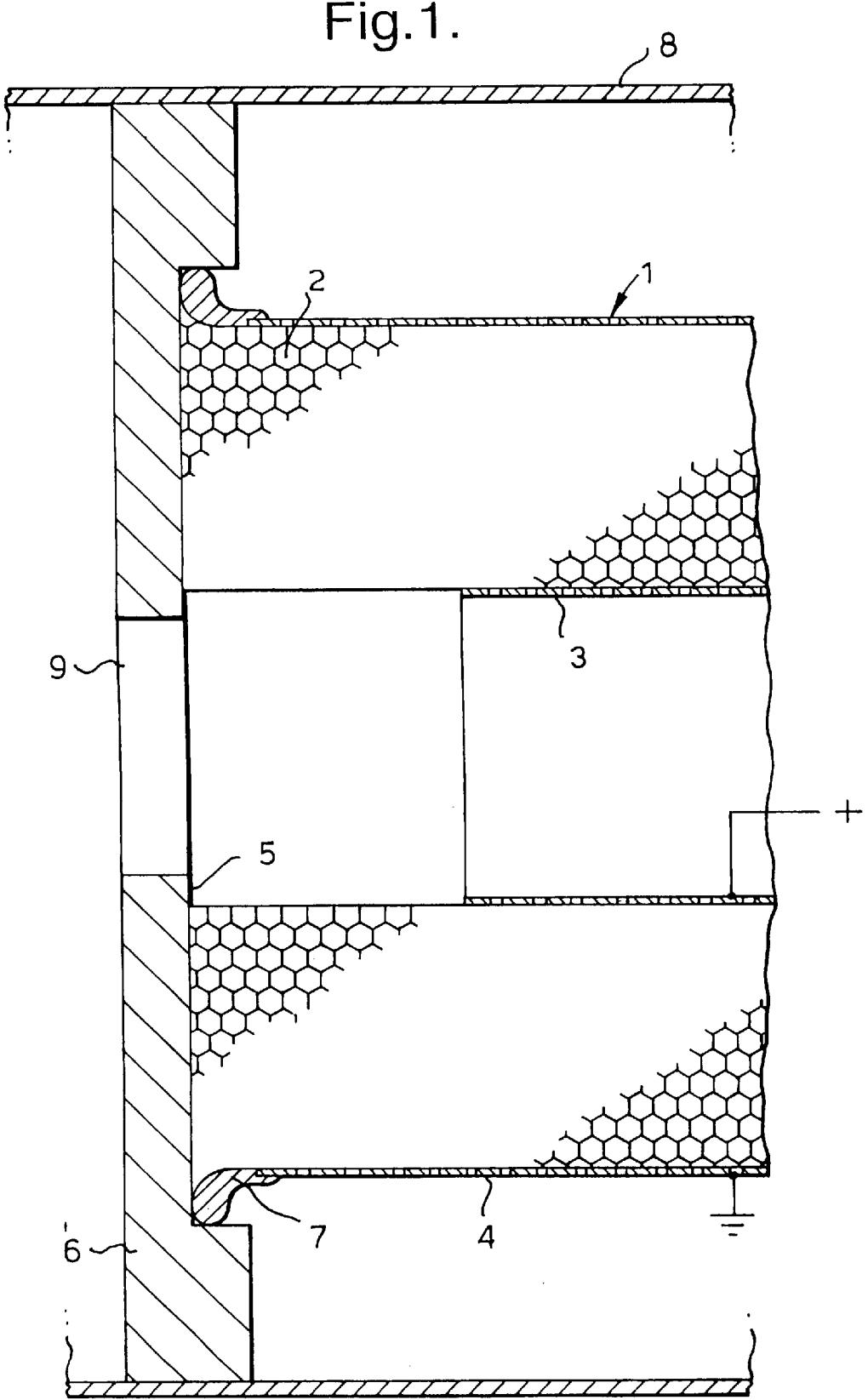
FIG. 1 shows figuratively a cross-section of one end of a reactor bed forming part of a reactor embodying the invention.

Referring to FIG. 1, there is shown a portion of a reactor bed assembly 1 for the plasma processing of a gaseous medium such as the exhaust gases from an internal combustion engine. The reactor bed assembly 1 consists of a cylindrical reactor bed made of a body 2 of ceramic material, such as activated alumina, which has a honeycomb or open-celled foam structure. The body of ceramic material is positioned between two concentric stainless steel perforated or mesh electrodes 3 and 4. The body 2 of ceramic material projects beyond the ends of the electrodes 3 and 4 and is positioned in a circular recess 5 formed in a metal support plate 6 by an electrically conducting collar 7. The collar 7 also fits over the end of the outer electrode 4 and serves to connect together (at earth potential) the outer electrode 4, the support plate 6, and outer casing 8. In an alternative arrangement, the outer electrode 4 may locate directly in the support plate 6, in which case the collar 7 is not needed. The inner electrode 3 terminates at a distance from the support plate 6 such that tracking or arcing between it and the end plate is unlikely to occur. An identical arrangement exists at the other end of the reactor bed assembly. The inner electrode 3 is arranged to be connected to a source of a potential of the order of tens of kilovolts (not shown) and the outer electrode 4 is arranged, as mentioned above, to be connected to earth. The metal support plate 6 and the corresponding support plate at the other end of the reactor bed assembly 1 position the reactor bed assembly 1 within the reactor casing 8, only part of which is shown. The support plate 6 has a central hole 9 which is aligned with a connecting nozzle (not shown) in the corresponding end of the reactor casing 8. The other support plate, which is not shown, has no central hole and is arranged to be a gas tight fit in the reactor casing 8. Adjacent the inward surface of the second support plate is a radially pointing nozzle. Thus, a gaseous medium to be processed in the reactor is constrained to flow radially through the body 2 of ceramic material.

On a larger scale the support plates 6 can comprise end flanges for a gas processing reactor with the main reactor casing extending between them.

Figure 2:
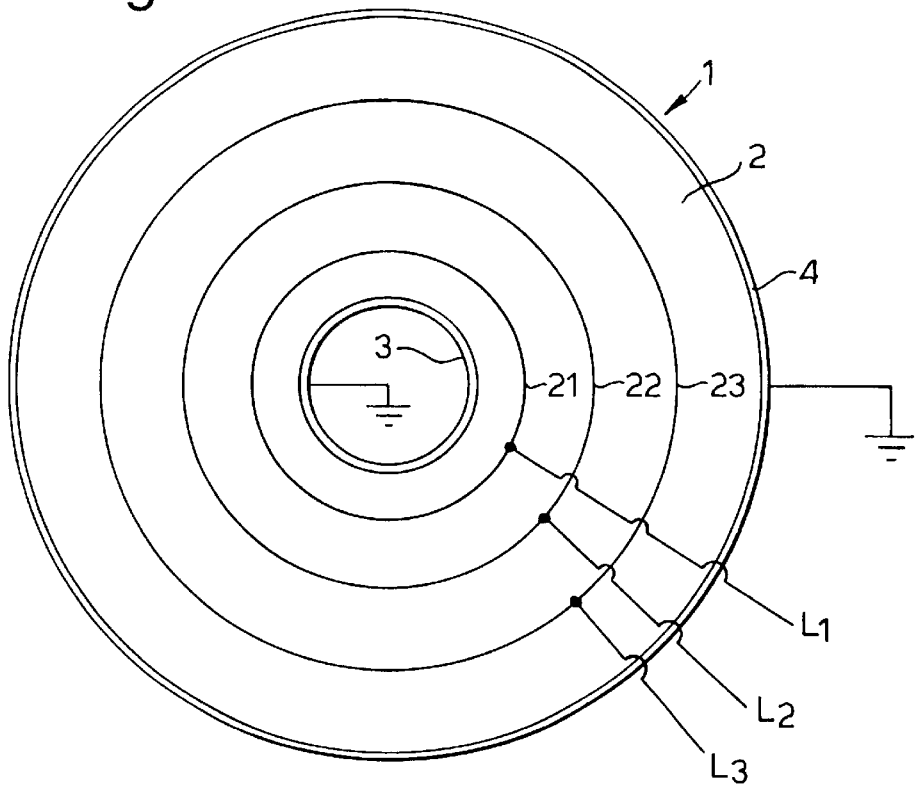
FIG. 2 shows diagrammatically an arrangement of electrodes suitable for use with a three-phase power supply and a radial flow of gas to be treated through the reactor bed.

Referring to FIG. 2 there is shown a cross-section of a radial gas flow reactor bed assembly 1 for use with a three-phase input power supply. In this case, both the inner and outer perforated electrodes 3 and 4 respectively, are earthed and dispersed regularly throughout the body 2 of ceramic material are three concentric cylindrical perforated electrodes 21, 22 and 23 which are connected to respective three-phase voltage input lines $L$, $L_2$ and $L_3$.

Figure 3:
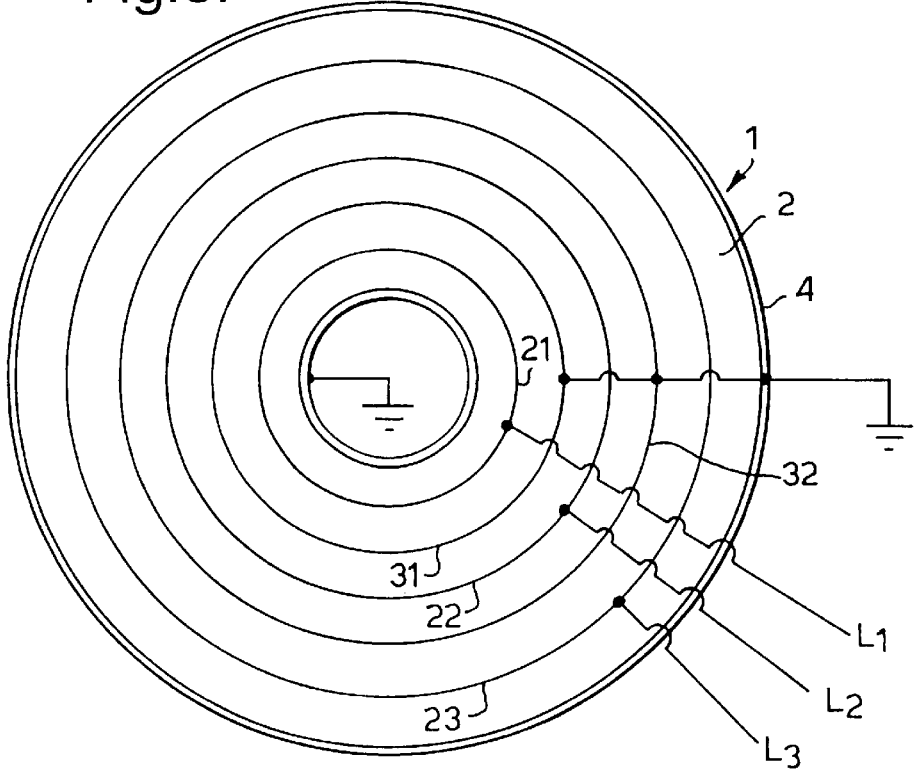
FIG. 3 shows diagrammatically a second arrangement of electrodes suitable for use with a three phase power supply and a radial flow of gas to be treated through the reactor bed.

Referring to FIG. 3 there is shown a cross-section of a second radial-flow reactor bed assembly 1 for use with a three-phase input power supply. In this case, not only are the inner and outer electrodes 3 and 4 earthed, but further earthed concentric perforated cylindrical electrodes 31 and 32 are interposed between electrodes 21 and 22 and 22 and 23, respectively.

Figure 4:
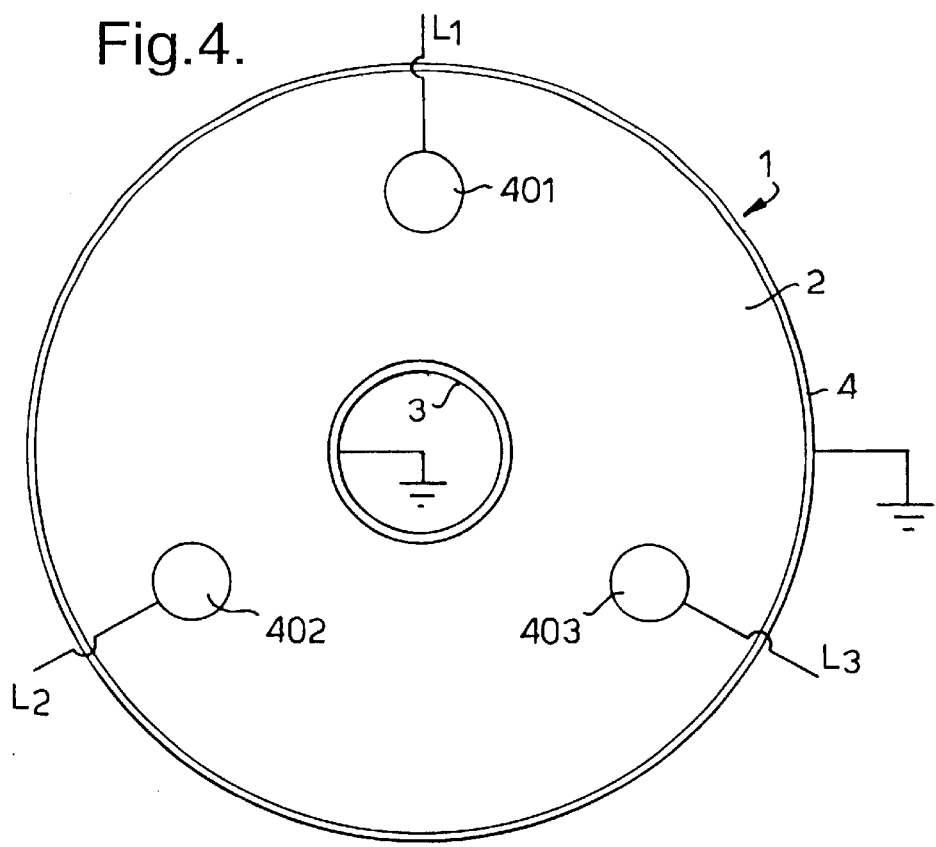
FIG. 4 shows diagrammatically a third arrangement of electrodes suitable for use with a three phase power supply and a radial flow of gas to be treated through the reactor bed.

Referring to FIG. 4, there is shown a cross-section of a third radial-flow reactor bed assembly 1 for use with a three-phase input power supply. In this case, again the inner and outer electrodes 3 and 4, respectively, are earthed. The concentric intermediate electrodes are replaced by three parallel regularly spaced rod electrodes 401, 402 and 403 each of which is connected to one of the lines of a three-phase power supply. The rod electrode 401, 402 and 403 can be solid, or hollow and water-cooled, or cooled with any suitable fluid coolant.

Figure 5:
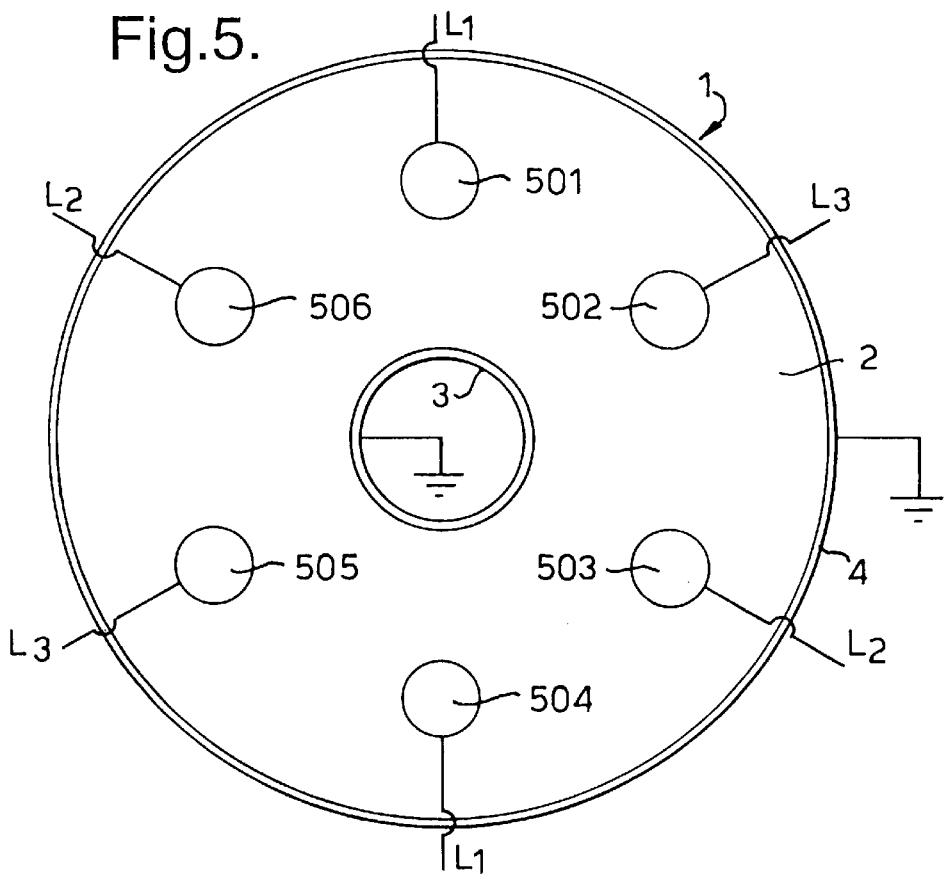
FIG. 5 shows diagrammatically a fourth arrangement of electrodes suitable for use with a three phase power supply and a radial flow of gas to be treated through the reactor bed.

Referring to FIG. 5, an arrangement similar to that of FIG. 4 is shown, but the three electrodes 401, 402 and 403 are replaced by six rod electrodes 501, 502, 503, 504, 505 and 506, connected as shown.

Figure 6:
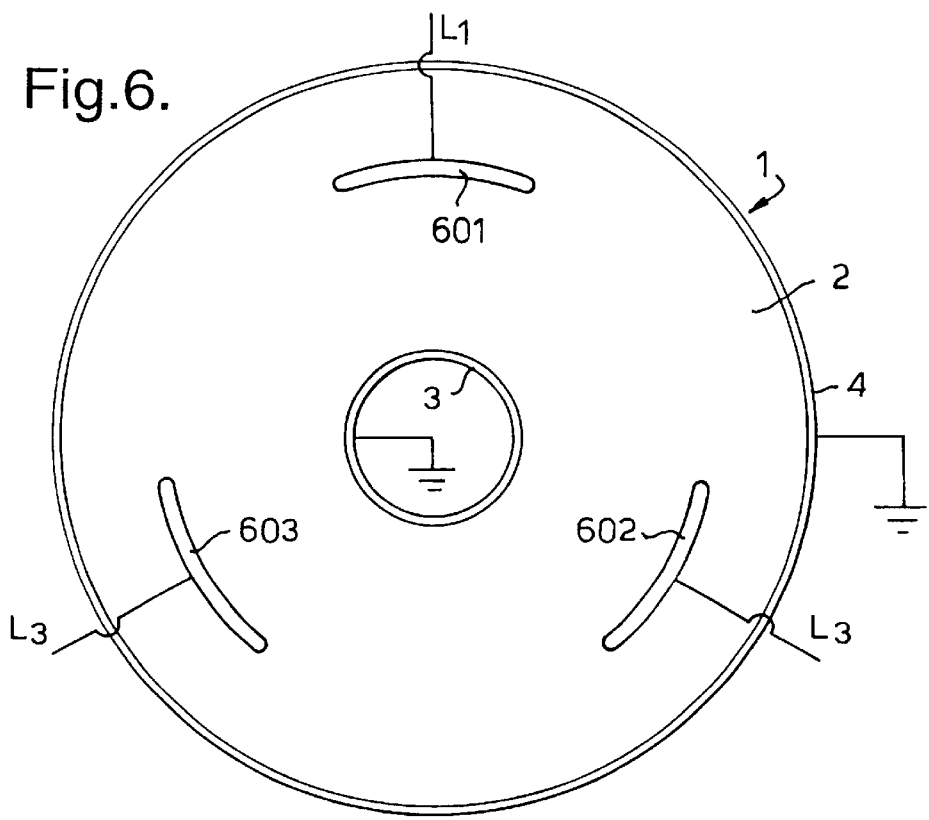
FIG. 6 shows diagrammatically a fifth arrangement of electrodes suitable for use with a three phase power supply and a radial flow of gas to be treated through the reactor bed.

Referring to FIG. 6, there is shown another form of radial-flow reactor bed assembly 1 for use with a three-phase power supply. The arrangement is generally similar to that shown in FIG. 4, but the three rod electrodes 401, 402 and 403 are replaced by three identical part cylindrical electrodes 601, 602 and 603, connected as shown. The electrodes 601, 602 and 603 may be solid or hollow and water-cooled. If they are solid, then they can be made of perforated material so as to minimise the obstruction to the flow through the reactor body 1 of the gaseous medium being treated.

Figure 7:
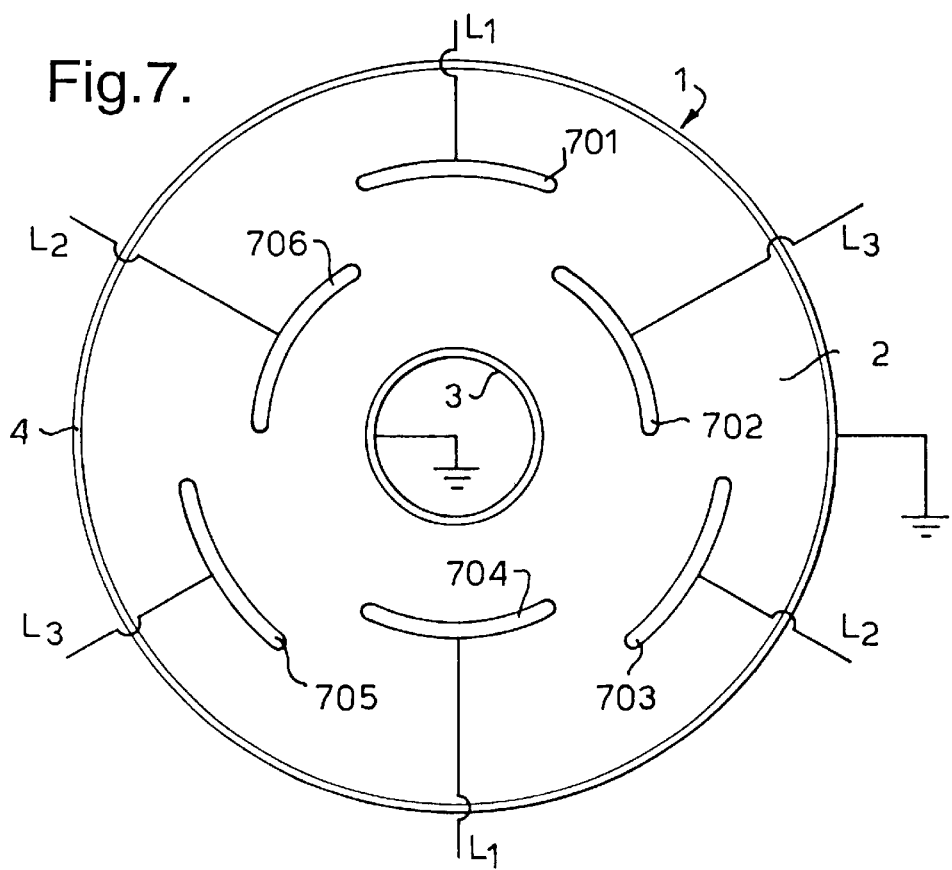
FIG. 7 shows diagrammatically a sixth arrangement of electrodes suitable for use with a three phase power supply and a radial flow of gas to be treated through the reactor bed.

FIG. 7 shows another arrangement of part-cylindrical electrodes 701, 702, 703, 704, 705 and 706. The electrodes 701, 702, 703, 704, 705 and 706 are arranged in two groups of three, each group having a common, but different radius of curvature. As with the FIG. 6 arrangement, the electrodes 701, 702, 703, 704, 705 and 706 can be solid, hollow, with or without cooling, or solid and perforated. If the electrodes 701, 702, 703, 704, 705 and 706 are solid or hollow, then the gaseous medium being treated in the reactor cannot flow radially but follows a serpentine path from the inner electrode 3 to the outer electrode 4. This can be advantageous in that the residence time of the gaseous medium in the body 2 of active material in the reactor bed assembly is increased. This effect can be enhanced by ensuring that the width of the electrodes 701, 702, 703, 704, 705 and 706 is such that a degree of overlap occurs.

The electrodes of FIGS. 5 and 7 are shown connected in pairs to a three-phase power supply. However, if desired a six-phase power supply can be provided with each electrode connected to receive a separate phase. This principle of connection can be extended to any chosen multiphase supply.

Figure 8:
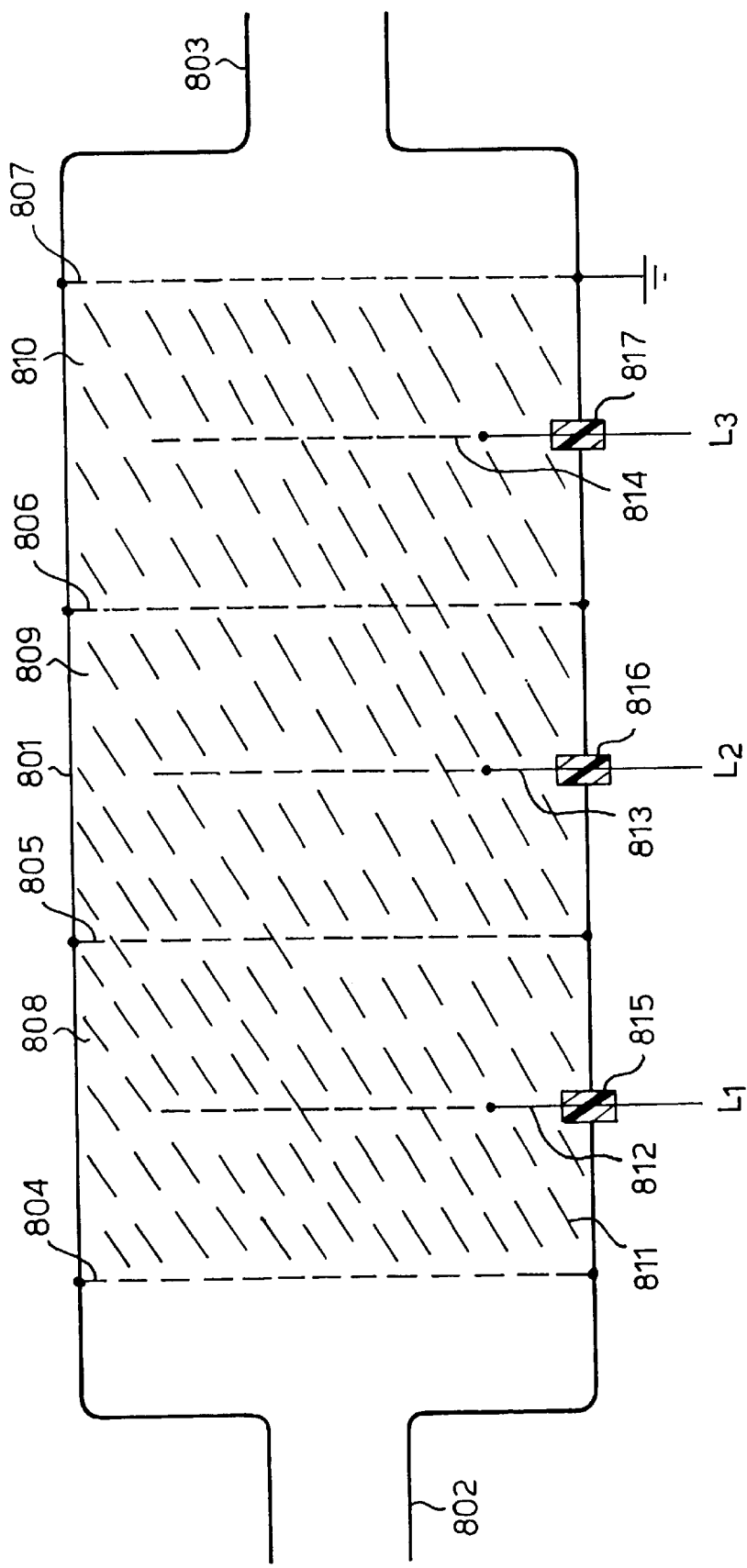
FIG. 8 shows diagrammatically an arrangement of electrodes suitable for use with a three phase power supply and an axial flow of gas to be treated through the reactor bed.

FIG. 8 shows an axial flow gas processing reactor consisting of a metal, preferably stainless steel, chamber 801 which has inlet and outlet nozzles 802 and 803, respectively. Spaced regularly along the chamber 801 are four stainless steel grids 804, 805, 806 and 807 which are connected electrically to the chamber 801, which in use is earthed. In the centres of the spaces 809, 810, 811 between the grids 804, 805, 806 and 807 are further grids 812, 813 and 814 respectively, which are arranged to be connected to a three phase high voltage power supply (not shown) via electrical feed-throughs 815, 816, and 817 respectively. The grids 812, 813 and 814 have a smaller diameter than that of the chamber 801, so that when the spaces 809, 810 and 811 between the grids 804, 805, 806 and 807 are filled with pellets of a ceramic active material such as activated alumina (or barium titanate or other ferroelectric, or a combination of ferroelectric and catalytic material) to form a reactor bed 808, the high voltage electrodes formed by the grids 812, 813 and 814 are embedded within the reactor bed 808.

Figure 9:
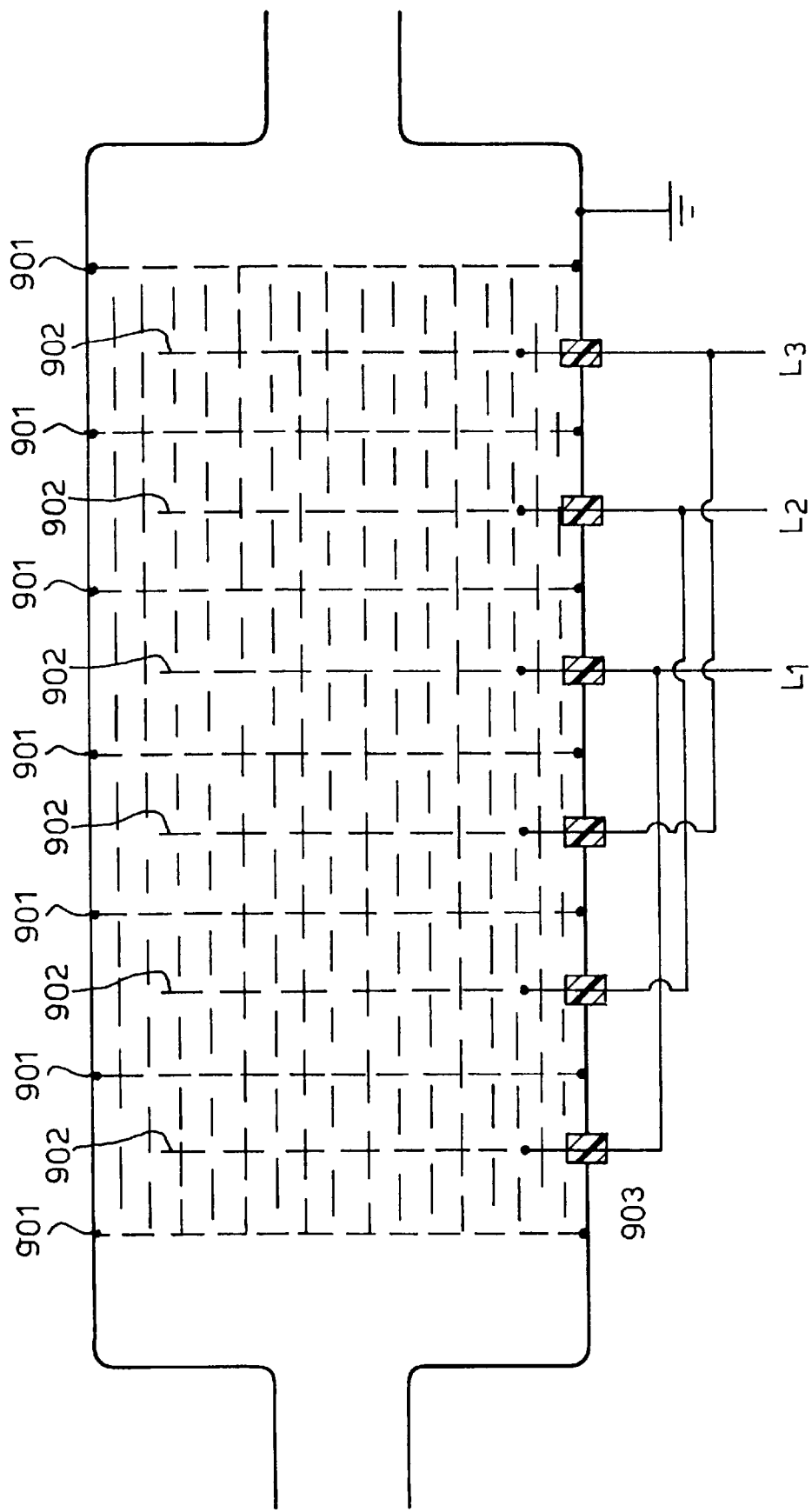
FIG. 9 shows diagrammatically a second arrangement of electrodes suitable for use with a three phase power supply and an axial flow of gas to be treated through the reactor bed.

FIG. 9 shows another axial-flow gas processing reactor which is similar to that described with reference to FIG. 8 except that there are two sets of earthed electrodes 901 formed by transverse grids and high voltage electrodes 902 embedded within a reactor bed 903 contained between the first and last earthed electrodes 901. In use, the electrical connections are as shown in the Figure.

Figure 10:
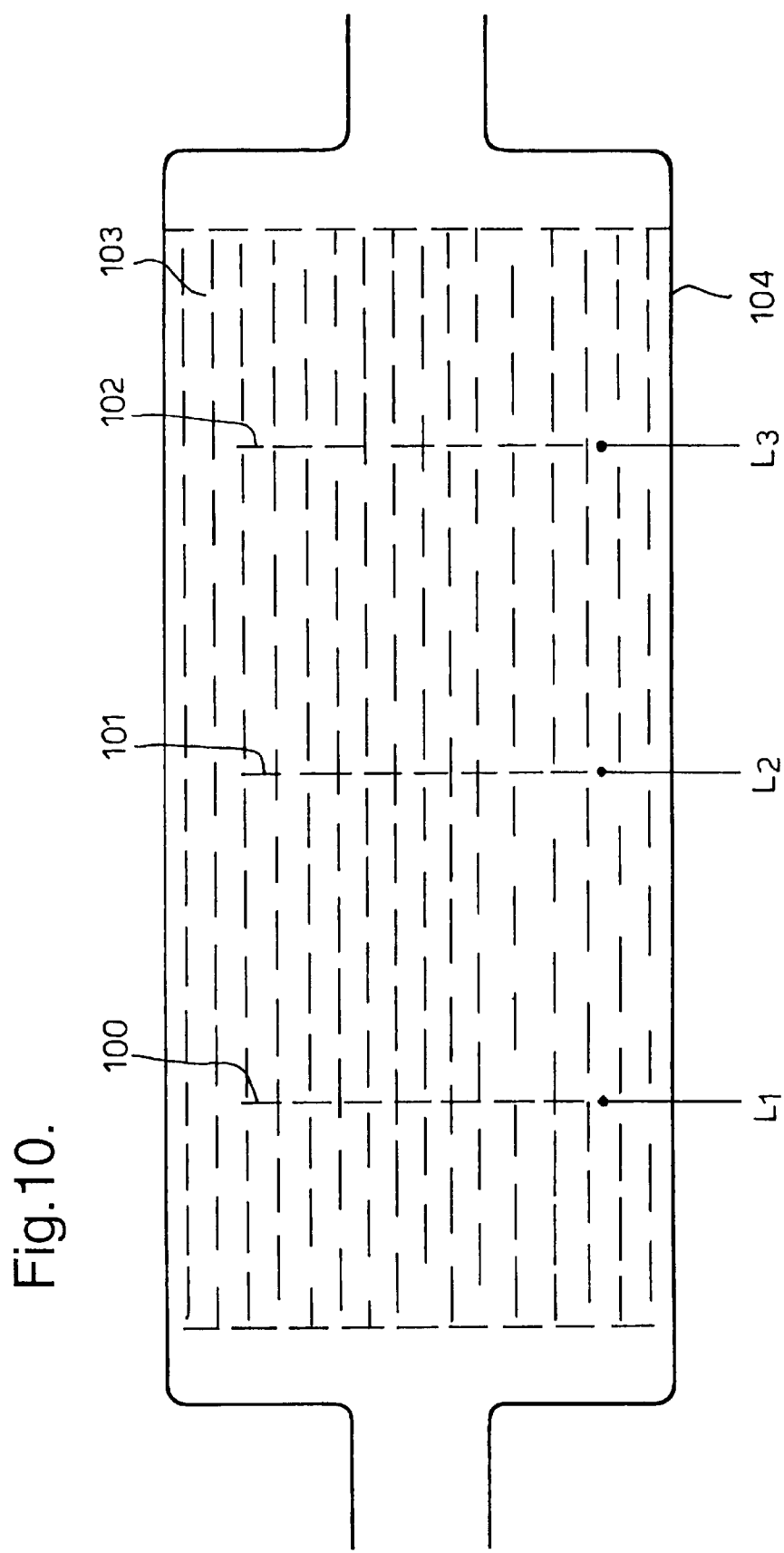
FIG. 10 shows diagrammatically a third arrangement of electrodes suitable for use with a three phase power supply and an axial flow of gas to be treated through the reactor bed.

FIG. 10 shows a third axial flow gas processing reactor for use with a three phase power supply, which has three regularly spaced high voltage electrodes 100, 101 and 102 embedded in a body 103 of gas permeable active ceramic material contained in an earthed stainless steel chamber 104. As shown, the body 103, of active material has a self-supporting structure, for example, an open celled honeycomb or foam, so there is no need for any containing grids at each end of the body 103 of active material. If, however, the active material is in the form of granules, or pellets, then it is necessary to have such supporting grids, in which case, they are connected electrically to the chamber 104.

Figure 11:
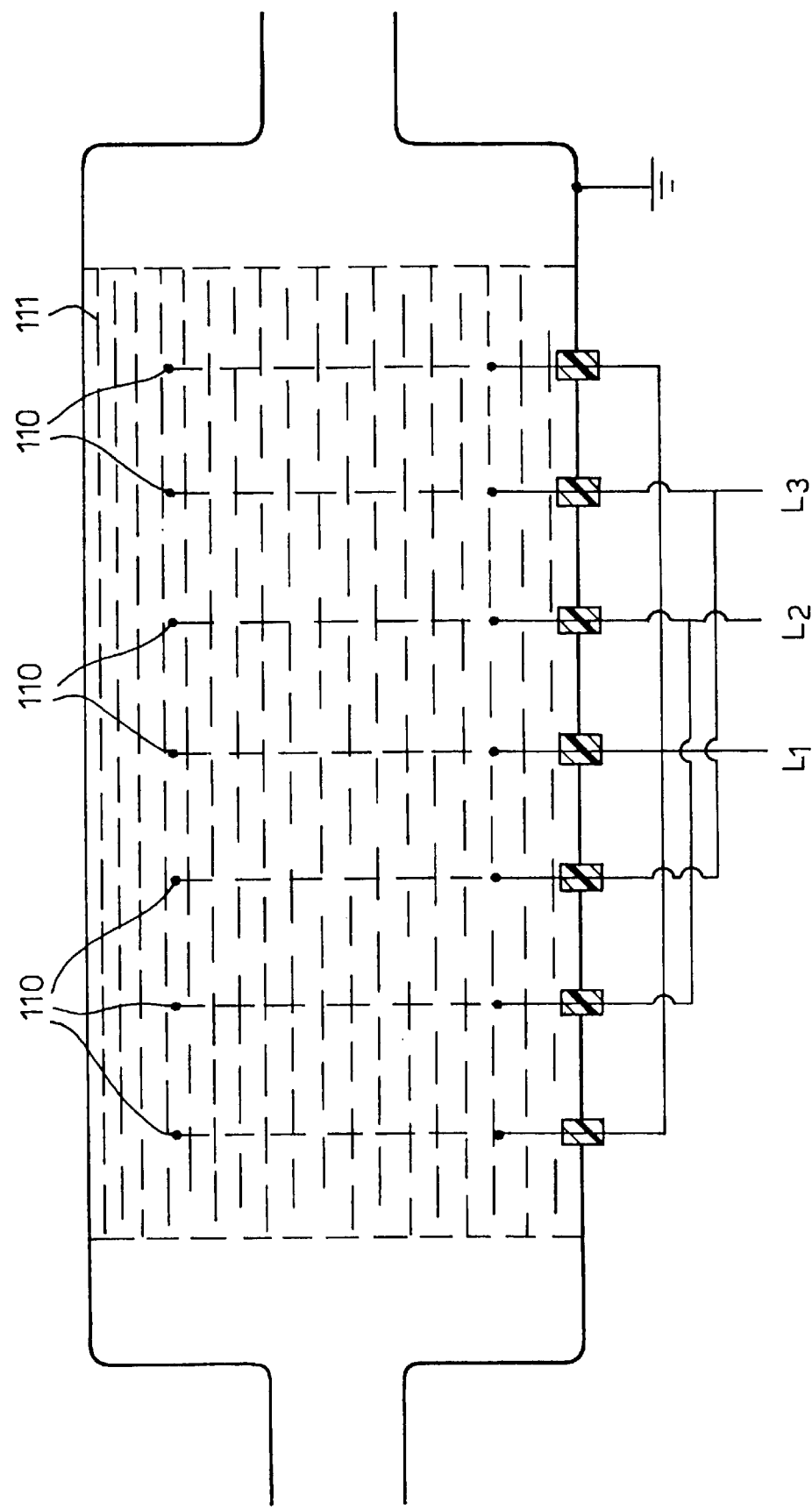
FIG. 11 shows diagrammatically a fourth arrangement of electrodes suitable for use with a three phase power supply and an axial flow of gas to be treated through the reactor bed.

FIG. 11 shows another axial-flow gas processing reactor for use with a three-phase power supply which is similar to that of FIG. 10, except that there are seven high voltage electrodes 110 embedded in the body 111 of active material. The electrodes 110 are arranged to be connected as shown.

Alternatively, the high voltage grid electrodes shown in FIGS. 8 to 11 may be set in annuli of a non-conducting, preferably ceramic, material.

Figure 12:
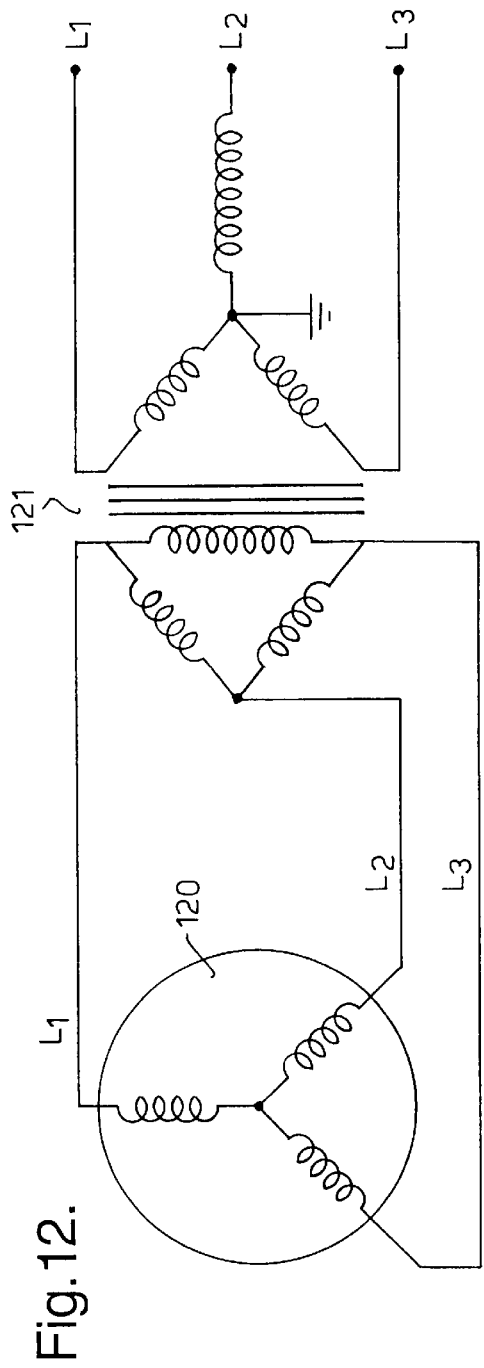
FIG. 12 shows diagrammatically a three phase power supply suitable for use with any of the electrode arrangements shown in FIGS. 2 to 11.

FIG. 12 shows diagrammatically a three phase power supply which is suitable for use with any of the above embodiments of the invention. A three-phase alternator 120 is arranged to produce an output voltage of about 100 volts rms, which is applied to a three-phase step-up transformer 121. The transformer 121 is arranged to produce an output voltage of the order of tens of kilovolts, as shown. A suitable frequency for the power supply is of the order of kilohertz.

Figure 13:
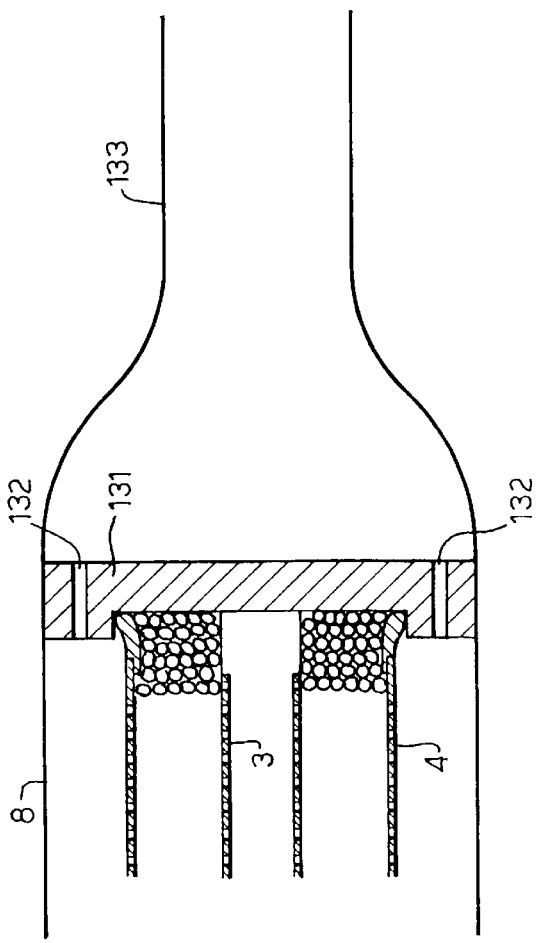
FIG. 13 shows diagrammatically an alternative other end of a reactor bed of a reactor embodying the invention.

FIG. 13 shows a second way of providing radial gas flow through the reactor bed 1. Referring to FIG. 13, the second support plate for the electrodes 3 and 4, designated 131, does not have a central hole but a ring of axial holes 132 disposed around its periphery. The holes 132 open into the space between the outer electrode 4 and the reactor chamber wall 8 and connect this space to an axial outlet 133. This arrangement causes gases entering the inside of the inner electrode 3 to pass radially through the reactor bed 2, as before.

The in-line arrangement of the inlet and outlet from the reactor chamber 8 makes this design particularly suitable for use with internal combustion engine exhaust systems.

The electrode configurations of FIGS. 2, 3, 8, 9 10 and 11 lend themselves well to an arrangement in which the bed of active ceramic material has regions of different characteristics. Such regions of differing characteristics have a variety of forms and purposes. They are most easily provided in a bed comprising spheres, pellets, granules or the like of the active material held in position by the combination of containment chamber and the electrodes, but a foam or honeycomb can be constructed with regions of different characteristics.

The differences provided can be differences in material composition of the active material according to its purpose, such as to provide respectively a region of high permittivity or oxidative catalytic activity in one region and reducing catalytic activity in another. The permeability may vary, e.g. by use of different particle sizes, from one region to another. This is a useful feature where the gas being processed contains particulates such as soot so that the particulates are filtered out more uniformly within the bed rather than collecting in the upstream region and tending to clog the bed entry region.

A further possibility provided by differences in bed characteristic from one region to another is a gradation of permittivity which can be useful for controlling the electric field strength in the respective regions. For example, it is possible to improve the uniformity of electric field strength across the radial extent of a cylindrical reactor by a radial gradation in permittivity.

These various configurations have particular usefulness for the treatment of gases, such as exhaust gases from internal combustion engines, containing carbonaceous particulates (such as soot), carbon monoxide, unburnt hydrocarbons and oxides of nitrogen. Reduction or removal of noxious constituents thus requires a variety of actions from entrapment and oxidation of soot, oxidation of carbon monoxide and unburnt hydrocarbons, to reduction of nitrogen oxides. Flow of the gases through a graded bed can thus provide for the required actions to occur sequentially on the gases.

What is claimed is:

1. A reactor for the plasma processing of gaseous media, comprising a reactor chamber including a gas permeable bed of non-conducting active material contained between at least one grounded electrode and at least one gas permeable member adapted to act as a high tension electrode and means for constraining a stream of a gaseous medium to be processed to flow through the bed of active material, wherein a plurality of high tension electrodes is embedded within the bed of active material and the electrodes are distributed to provide a predetermined electric field distribution within the bed of active material.

2. A reactor as claimed in claim 1, wherein the high tension electrodes are arranged in groups of a multiplicity of three (or more) and connected to a corresponding multi (three or more)-phase alternating current power supply.

3. A reactor as claimed in claim 2, wherein the high tension electrodes are constructed to provide for the passage therethrough of a coolant fluid.

4. A reactor as claimed in claim 1, wherein the high tension electrodes are constructed to provide for the passage therethrough of a coolant fluid.

5. A reactor as claimed in claim 1, wherein the high tension electrodes are part cylindrical in form and are distributed regularly within the bed of active material concentrically with inner and outer grounded cylindrical electrodes.

6. A reactor as claimed in claim 1, wherein at least the grounded electrode is gas permeable and the gaseous medium to be processed is constrained to pass radially through the bed of active material.

7. A reactor as claimed in claim 1 adapted for incorporation into the exhaust system of an internal combustion engine.

* * * * *